(12) United States Patent
Sugawara

(10) Patent No.: US 7,225,076 B2
(45) Date of Patent: May 29, 2007

(54) MAP SEARCH SYSTEM

(75) Inventor: Yoshihiko Sugawara, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/718,670

(22) Filed: Nov. 24, 2003

(65) Prior Publication Data
US 2004/0138810 A1    Jul. 15, 2004

(30) Foreign Application Priority Data
Jan. 10, 2003    (JP)    ............................ 2003-004328

(51) Int. Cl.
G01C 21/30    (2006.01)
G01C 21/32    (2006.01)
(52) U.S. Cl. ...................... 701/208; 701/209; 701/211; 701/213; 340/990
(58) Field of Classification Search ................ 701/200, 701/202, 201, 207–208, 209, 210, 213, 212, 701/35, 211; 340/990, 988, 995; 707/3; G01C 21/32
See application file for complete search history.

(56) References Cited

U.S. PATENT DOCUMENTS

| | | | | |
|---|---|---|---|---|
| 4,224,669 A | * | 9/1980 | Brame | 701/8 |
| 4,608,656 A | * | 8/1986 | Tanaka et al. | 701/212 |
| 4,971,174 A | * | 11/1990 | Abe et al. | 180/408 |
| 5,475,387 A | * | 12/1995 | Matsumoto | 340/990 |
| 5,506,396 A | * | 4/1996 | Asami | 235/492 |
| 5,557,522 A | * | 9/1996 | Nakayama et al. | 701/200 |
| 5,698,836 A | * | 12/1997 | Fujioka | 235/492 |
| 5,719,387 A | * | 2/1998 | Fujioka | 235/492 |
| 5,845,228 A | * | 12/1998 | Uekawa et al. | 701/209 |
| 5,890,088 A | * | 3/1999 | Nimura et al. | 701/211 |
| 5,908,465 A | | 6/1999 | Ito et al. | |
| 5,933,776 A | * | 8/1999 | Kirkpatrick | 455/423 |

(Continued)

FOREIGN PATENT DOCUMENTS

EP    1260791 A1 * 11/2002

(Continued)

OTHER PUBLICATIONS

Unknown, MapQuest releases new mobile MapQuest version 3.0—Brief Article—Product Announcement, from http://www.findarticles.com/, Oct. 2001.*

(Continued)

Primary Examiner—Cuong Nguyen
(74) Attorney, Agent, or Firm—Posz Law Group, PLC

(57) ABSTRACT

Retrieving an on-map position is executed within a targeted search area that is one of search areas. Search information items are stored for retrieving. Each of the search information items is related to one of the search areas. Area-designating information items are also stored for designating one of the search areas. When a user selects, as a search item, one of address-book information items, address information included in the selected address-book information item is collated with the area-designating information items. A corresponding search area is thereby automatically designated as the updated targeted search area. Thus, based on the address-book information and area-designating information, the targeted search area is automatically switched into a search area that includes the retrieved on-map position. User's procedure in retrieving the on-map position can be thereby reduced.

8 Claims, 3 Drawing Sheets

U.S. PATENT DOCUMENTS

| | | | | |
|---|---|---|---|---|
| 5,948,040 | A | * | 9/1999 | DeLorme et al. ........... 701/201 |
| 5,961,571 | A | * | 10/1999 | Gorr et al. .................. 701/207 |
| 5,977,885 | A | * | 11/1999 | Watanabe .............. 340/995.19 |
| 6,041,281 | A | * | 3/2000 | Nimura et al. .............. 701/211 |
| 6,121,900 | A | * | 9/2000 | Takishita ............... 340/995.11 |
| 6,128,571 | A | * | 10/2000 | Ito et al. ....................... 701/201 |
| 6,182,121 | B1 | * | 1/2001 | Wlaschin .................... 709/215 |
| 6,401,038 | B2 | * | 6/2002 | Gia ............................. 701/301 |
| 6,405,107 | B1 | * | 6/2002 | Derman ......................... 701/3 |
| 6,484,091 | B2 | * | 11/2002 | Shibata et al. .............. 701/208 |
| 6,567,746 | B2 | * | 5/2003 | Kuroda et al. .............. 701/212 |
| 6,573,888 | B2 | * | 6/2003 | Hayashi et al. ............. 345/204 |
| 6,601,060 | B1 | * | 7/2003 | Tomaru ......................... 707/3 |
| 6,622,085 | B1 | * | 9/2003 | Amita et al. ................. 701/208 |
| 6,629,641 | B2 | * | 10/2003 | Tsikos et al. .......... 235/462.01 |
| 6,631,842 | B1 | * | 10/2003 | Tsikos et al. ............... 235/454 |
| 6,704,647 | B1 | * | 3/2004 | Monde et al. .............. 701/208 |
| 6,736,321 | B2 | * | 5/2004 | Tsikos et al. .......... 235/462.14 |
| 6,742,707 | B1 | * | 6/2004 | Tsikos et al. .......... 235/462.01 |
| 6,918,541 | B2 | * | 7/2005 | Knowles et al. ....... 235/462.01 |
| 6,923,374 | B2 | * | 8/2005 | Knowles et al. ............ 235/454 |
| 6,953,151 | B2 | * | 10/2005 | Tsikos et al. .......... 235/462.01 |
| 6,953,152 | B2 | * | 10/2005 | Tsikos et al. .......... 235/462.01 |
| 7,028,899 | B2 | * | 4/2006 | Tsikos et al. .......... 235/462.01 |
| 7,090,133 | B2 | * | 8/2006 | Zhu ....................... 235/462.01 |
| 2001/0003809 | A1 | * | 6/2001 | Hayashi et al. ............. 701/120 |
| 2001/0023390 | A1 | * | 9/2001 | Gia ............................. 701/301 |
| 2002/0004701 | A1 | * | 1/2002 | Nakano ....................... 701/200 |
| 2002/0026281 | A1 | * | 2/2002 | Shibata et al. .............. 701/208 |
| 2002/0090953 | A1 | * | 7/2002 | Aburai et al. ............... 455/456 |
| 2003/0034387 | A1 | * | 2/2003 | Knowles et al. ............ 235/375 |
| 2003/0062415 | A1 | * | 4/2003 | Tsikos et al. ................ 235/454 |
| 2003/0098349 | A1 | * | 5/2003 | Tsikos et al. .......... 235/462.01 |
| 2003/0229631 | A1 | * | 12/2003 | Arend et al. ..................... 707/3 |
| 2004/0049340 | A1 | * | 3/2004 | Usui ........................... 701/209 |

FOREIGN PATENT DOCUMENTS

| | | | | |
|---|---|---|---|---|
| JP | 63-64508 | | * | 3/1988 |
| JP | A-03-075998 | | | 3/1991 |
| JP | 04267477 | A | * | 9/1992 |
| JP | A-H08-305721 | | | 11/1996 |
| JP | A-10-307833 | | | 11/1998 |
| JP | 11-064523 | | * | 3/1999 |
| JP | 11-230761 | | * | 8/1999 |
| JP | 2000-050992 | | * | 2/2000 |
| JP | A-2002-107174 | | | 4/2002 |
| JP | A-2002-202142 | | | 7/2002 |
| WO | WO 2000US15624 | | * | 6/2000 |
| WO | WO 200231441 | A1 | * | 4/2002 |

OTHER PUBLICATIONS

Alan Cohen, A MapQuest road trip, from http://www.findarticles.com/ Jun. 2003, pp. 1-2.*

Peter J. Gallanis, AAIW awash with innovation, from http://www.findarticles.com/, Nov. 22, 1999.*

Lynn Woods, Getting there via computer—computerized mapping software—Evaluation, Oct. 1998, pp. 1-4.*

Unknown, Mapquest.com delivers wireless driving directions to Palm VII organizer users, from http://www.findarticles.com/, May 31, 1999.*

Unknown, How MapQuest gets you from here to there, from http://www.findarticles.com, Nov. 2003.*

Unknown, Sprint selects MapQuest.com to provide Internet-based driving directions to wireless Web phone users—Company business and marketing, from http://www.findarticles.com, Sep. 13, 1999.*

Unknown, MapQuest(R) Wireless Overview, from http://www.mapquestservices.com/mobile/, copyrighted 2004.*

Zhang et al., Segment-based matching for visual navigation, Computer and Information Science, University of Massachusetts at Amherst, COINS TR91-35, pp. 1-37 (Apr. 1991).*

Oh et al., A study of the characteristics of an ommidirectional vision sensor, Advances in Image Processing, SPIE vol. 804, pp. 259-268 (1987).*

Zheng et al., Panoramioc representation for route recognition by a mobile robot, Inter. Journal of Computer Vision, 9:1, pp. 55-76 (1992).*

Hong et al., Image-based navigation using 360 degree views, Proc. of Image Understanding Workshop, pp. 781-791, (1990).*

Geihs et al., Retrospective on DACNOS, Communications of the ACM, v33, n4, p. 439(10), Apr. 1990 (from DIALOG(R)File 275, acc. No. 01355132).*

Carr, Quova's GeoPoint, Network Magazine, 32, Jul. 1, 2001 (from DIALOG(R)File 275, acc. No. 02517006).*

Drogseth, Digging for the Root Cause of Network Problems . . . , Network Magazine, 96, May 1, 2001.*

Zhu et al., Theory of keyblock-based image retrieval, ACM Transactions on Information Systems, 20,2,224(34), Apr. 2002.*

* cited by examiner

FIG. 3

| NAME | A-NATIONAL PARK |
|---|---|
| STREET | 16 STREET |
| CITY | A |
| STATE | California |
| PHONE NO. | XX-XXXX-XXXX |

FIG. 4

| SEARCH INFO. | AREA NO. | AREA-DESIGNATING INFO. |
|---|---|---|
| 1 Oregon | 1 | Oregon, Carson City, Portland..... |
| 2 Nevada | 2 | Nevada, Carson City, Las Vegas |
| 3 California | 3 | California, Sacramento, Disneyland..... |

MAP SEARCH SYSTEM

CROSS REFERENCE TO RELATED APPLICATIONS

This application is based on and incorporates herein by reference Japanese Patent Application No. 2003-4328 filed on Jan. 10, 2003.

FIELD OF THE INVENTION

The present invention relates to a map search system enabling a user to reduce procedure for retrieving an on-map position on map data. In particular, it relates to a map search system uses map data that covers a wide range of region having a plurality of search areas. Here, the map search system is capable of automatically designating a corresponding search area as a targeted search area within which an on-map position can be retrieved.

BACKGROUND OF THE INVENTION

A car navigation device is conventionally equipped with a map search system for retrieving an on-map position that is a position on map data with purposes such as designating a destination. Namely, when a map search system is started by user's input of a search item such as an address, a phone number, a facility name, or the like, an on-map position corresponding to the inputted search item is retrieved on map data. A map around the on-map position is then displayed on a display unit. The user thereby recognizes the on-map position on the displayed map and designates the on-map position as a destination through manipulating a switch.

For the above map search system, the car navigation device possesses search information items that are related to the respective on-map positions. The search information items include an address, a phone number, a facility name, or the like inputted as the search item.

In a car navigation device using map data that covers a wide range of region, the wide range of region is divided into a plurality of search areas. The search information items belong to the respective search areas. Namely, each of the search information items is related to one of the plurality of search areas. Here, when a search item is inputted, within a targeted search area the inputted search item is collated with search information items related to the targeted search area. The reason why a search area for retrieving the on-map position is limited to the single targeted search area is that the number of candidates of the search information items becomes too large if an area for retrieving is expanded to the entire wide range of region.

The above-mentioned targeted search area is typically designated by the user. Once the targeted search area is designated, the designated targeted search area is apt to be continuously retained. Therefore, when a certain search area including a destination is different from the targeted search area, the user needs to switch the targeted search area from the currently designated search area into the certain search area. Here, the user at first determines whether the certain search area is currently designated as the targeted search area. When the certain area is determined to be currently not designated, the user needs to switch the targeted search area from the current search area into the certain search area. This involves user's bothersome procedure for switching the targeted search area in the map search.

SUMMARY OF THE INVENTION

It is an object of the present invention to provide a map search system capable of reducing bothersome procedure for retrieving an on-map position even when a map search is executed within a targeted search area that is previously designated among a plurality of search areas.

To achieve the above object, a map search system using map data is provided with the following. An item is selected for retrieving an on-map position. Search information items are stored. Here, a given search information item is related to a given search area of search areas and used for retrieving an on-map position related to the given search information item within the given search area. Within a targeted search area, an on-map position corresponding to the selected item is retrieved by collating the selected item with search information items related to the targeted search area. Area-designating information items are stored. Here, an area-designating information item is related to a search area of the search areas. It is then determined whether the selected item corresponds to any one of the area-designating information items. When the selected item is determined to correspond to a certain area-designating information item that is related to a certain search area, the certain search area is designated as the targeted search area.

In this structure, a targeted search area is automatically designated based on address-book information and area-designating information. User's procedure in designating a targeted search area for retrieving an on-map position can be thereby reduced.

BRIEF DESCRIPTION OF THE DRAWINGS

The above and other objects, features, and advantages of the present invention will become more apparent from the following detailed description made with reference to the accompanying drawings. In the drawings:

FIG. 3 is a diagram showing a structure of an address-book information item according to the embodiment; and FIG. 4 is a diagram showing instances of area-designating information items according to the embodiment.

DETAILED DESCRIPTION OF THE PREFERRED EMBODIMENTS

A map search system according to an embodiment of the present invention will be explained with reference to drawings. The map search system of the embodiment is directed to a car navigation device 100, which will be explained below.

Figure 1:
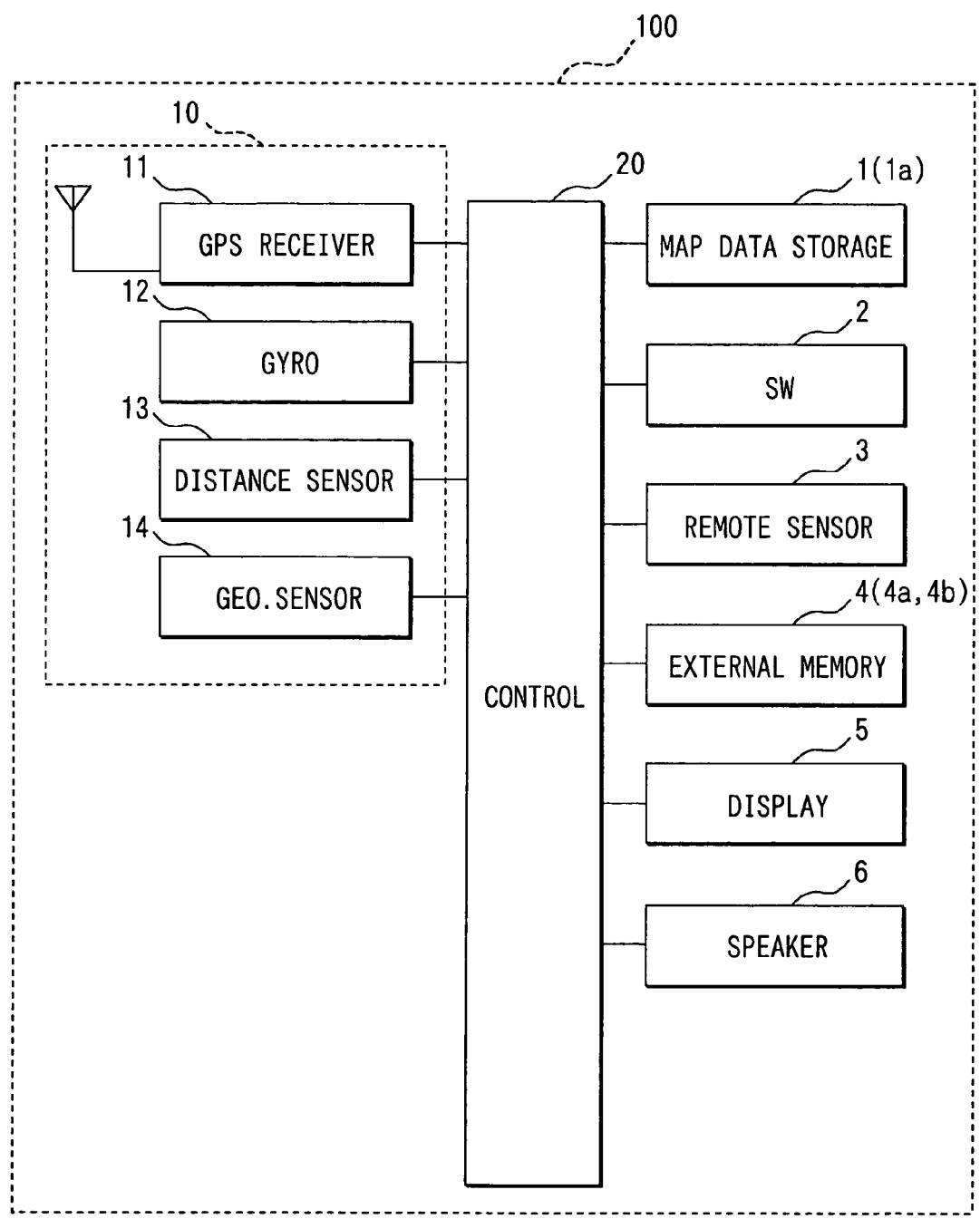
FIG. 1 is a schematic block diagram showing an overall structure of a car navigation device using a map search system according to an embodiment of the present invention.

FIG. 1 is a block diagram schematically showing an overall structure of a car navigation device 100. As shown in the figure, the car navigation device 100 mounted in a vehicle includes a map data storage 1, a manipulation switch group 2, a remote controller sensor 3, an external memory 4, a display unit 5, a speaker 6, a position detector 10, and a control circuit 20, for controlling navigation, connected with the preceding components.

The control circuit 20 is constructed as being a common computer having a CPU, a ROM, a RAM, an I/O, and a bus that is connected with the preceding components. The ROM is stored with an executable program of the control circuit 20. According to the executable program, the CPU executes a given computation.

The map data storage 1 stores search information 1a and map data for displaying a road map. The map data storage is for inputting the search information 1a and the map data into the control circuit 20. As the map data storage 1, a DVD-ROM or a CD-ROM is typically used based on its data volume, but a memory card, a hard disk, or the like can be also used.

The map data includes road data indicating connection states between roads and land mark data including facilities and indication characters that are displayed along with the road data. The map data is used for displaying a road map on a screen of the display unit 5. The map data is formed on a basis of given latitude and longitude as a reference. When a destination is searched for, an on-map destination position that is a destination position on the map data can be designated based on the coordinates of the latitude and longitude of the destination. The search information 1a includes facility names, facility types, phone numbers, addresses, coordinates, or the like. The search information 1a is used when a search function is executed. The search function is for retrieving an on-map position or an on-map facility corresponding to an address, a facility name, or the like inputted by a user.

Each of search information items 1a included in the search information 1a is stored in the map data storage 1 with being related to one of a plurality of search areas. Namely, each of the search information items belongs to one of the search areas. Here, an entire region covered by the map data is divided into the plurality of search areas. When the search function is executed, one of the plurality of search areas is designated as a targeted search area and only search information items 1a related to the targeted search area are thereby searched. The reason why a search area for retrieving the on-map position is limited to the single targeted search area is that the number of candidates of the search information items becomes too large if a search area is expanded to the entire wide range of region. This naturally involves a longer search processing period or increase of the number of extracted candidates. Bothersome procedures are thereby needed for designating the on-map position.

The manipulation switch group 2 includes touch panel switches that are integrated with the display unit 5 or mechanical switches to be used for various input. The remote controller sensor 3 is for receiving manipulating signals from a remote controller (not shown) and for inputting the received signals into the control circuit 20. Namely, the manipulation switch group 2 and the remote controller sensor 3 are used for detecting user's input manipulation for inputting or selecting a search item corresponding to a position.

The external memory 4 including an external storage medium such as a flash memory, a memory card, or the like stores various programs, address-book information 4a, area-designating information 4b used for automatically designating a targeted search area, or the like.

The display unit 5 including an LCD (Liquid Crystal Display) is for receiving image output signals from the control circuit 20. The display unit 5 is for displaying: an own vehicle mark that is displayed based on a vehicle's present position detected by the position detector 10; a map surrounding the present position generated by using the map data inputted from the map data storage 1; the contents of the address-book information 4a. When a search item is selected by input of an address of a position or the like or by using the address-book information 4a, the display unit 5 is used for further displaying the on-map position and its surrounding map that correspond to the selected search item.

The speaker 6 is, e.g., for notifying via speech a guide route when route assistance is executed by setting a destination, or for notifying via speech an effect of switching the targeted search area when the targeted search area is switched.

The position detector 10 includes a GPS (Global Positioning System) receiver 11, a gyroscope 12, a distance sensor 13, a geomagnetic sensor 14, or the like. The GPS receiver 11 detects the present position of the vehicle based on radio waves from GPS satellites. Each sensor 11 to 14 has a different characteristic and detection accuracy, so that high position detection accuracy is obtained by adjusting the respective errors through combining signals from the sensors 11 to 14. Here, a required accuracy level may properly select some of the sensors 11 to 14 instead of selecting all the sensors 11 to 14. Furthermore, the position detector 10 can include a rotation sensor detecting a steering position, a speed sensor of each drive wheel, or the like.

The above-mentioned car navigation device 100 has a search function of a map search. In this function, when a search item indicating a position is inputted through the manipulation switch group 2 or remote controller (not shown), an on-map position corresponding to the inputted search item is retrieved. Here, the search item is a facility name, an address, a phone number, address-book information 4a, or the like. When the retrieved on-map position is set as a destination, a routing function is executed. In this function, a guide route is computed and displayed on the display unit 5 through automatically retrieving the most appropriate route from the present position to the destination.

The above functions are executed through various processing mainly by the control circuit 20. In detail, when a search item corresponding to a position is selected, the control circuit 20 extracts, using the search information 1a belonging to the targeted search area, a position or a facility matching to the selected search item from the search information 1a. The extracted position or facility is displayed on the display unit 5 along with a surrounding map. Furthermore, when the position is set as a destination, a guide route is computed using the road data of the map data in the map data storage 1 to be displayed on the display unit 5. When the routing function is executed, branching positions or intersections for turning right or left are zoomed in on the map or notified via speech.

In the next place, as a feature of the embodiment, processing of automatically switching a targeted search area will be explained below with reference to FIGS. 2 to 4.

Referring to FIG. 3, each address-book information item of the address-book information 4a includes a facility name or a person name (in a case of a personal residence), an address, and a phone number. These individual items of the address-book information item 4a are principally inputted and registered by a user. When the individual items are thus registered, using the registered individual items retrieving an on-map position can be easily executed. In detail, through manipulation of displaying the address-book information 4a, the individual items registered in the address-book information item 4a are displayed as a one-page list or with scrolling pages. When one of the displayed individual items is then selected as a search item, an on-map position corresponding to the selected individual item can be retrieved.

Referring to FIG. 4, the area-designating information 4b is set with being related to search areas. Namely, the area-designating information 4b includes groups of area-designating information items. Each of groups is related to each of search areas No. 1, 2, 3, etc. Here, each of the search areas includes a group of own search information items 1a.

Figure 2:
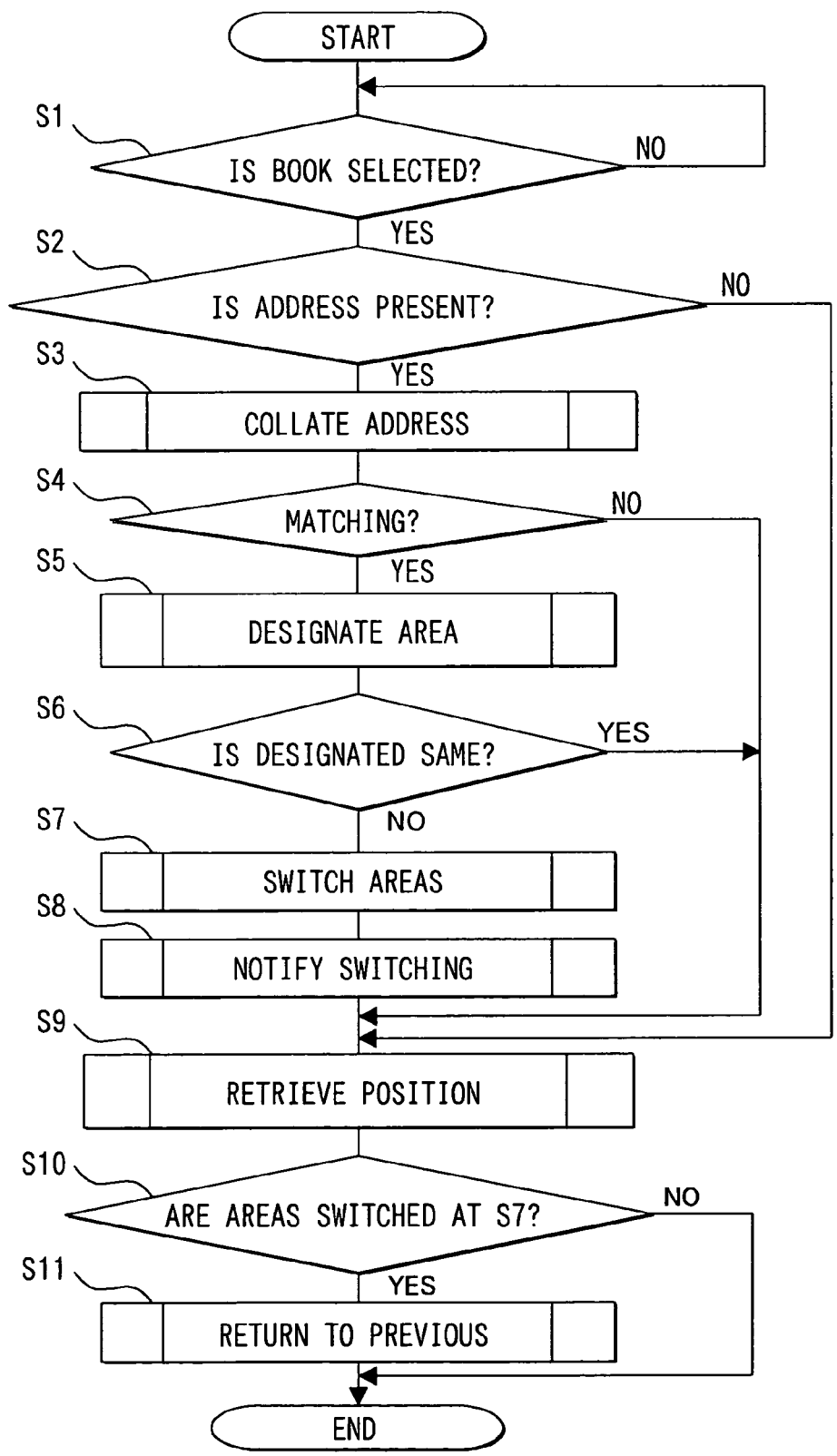
FIG. 2 is a flowchart diagram showing processing of automatically switching a targeted search area according to the embodiment.

Referring to FIG. 2, at Step 1, it is determined whether a single address-book information item registered in the address-book information 4a is selected as a search item for retrieving an on-map position. Here, it is provided that a given search area is previously designated as a targeted search area. When the single address-book information item 4a is determined to be selected, the processing proceeds to Step 2.

At Step 2, it is determined whether address information is included in the selected address-book information item 4a. Namely, since each of the address-book information items (that is, the individual items) of the address-book information 4a is principally registered by the user, whether the user registers the address information is confirmed. When the address information is determined to be not included, the processing proceeds to Step 9. Here, the given search area currently designated as the targeted search area is retained as the targeted search area. The individual items registered in the selected address-book information item 4a are then collated with the search information items 1a belonging to the given search area. By contrast, when the address information is determined to be included, the processing proceeds to Step 3.

At Step 3, the address information is collated with the area-designating information 4b. For instance, state information is included in the registered individual items shown in FIG. 3. The state information is thereby collated with the area-designating information 4b. When the state information is not registered and city information is instead registered, the city information can be collated with the area-designating information 4b.

At Step 4, it is determined whether an area-designating information item 4b matching to the address information is present as a result of Step 3. When an area-designating information item 4b matching to the address information is determined to be present, the processing proceeds to Step 5. Here, when the area-designating information item 4b matching to the address information belongs to a certain search area, the certain search area is once designated as a candidate of a targeted search area. Otherwise, when any area-designating information item 4b matching to the address information is determined to be not present, the processing proceeds to Step 9.

As explained above, as shown in FIG. 4, the area-designating information 4b includes the groups of area-designating information items. Each of the groups is related to each of the search areas No. 1, 2, 3, etc. Accordingly, when state or city information is included as the address information and matches to given area-designating information 4b, a search area corresponding to the given area-designating information 4b can be designated as a targeted search area. In an instance shown in FIGS. 3, 4, "California" as state information is registered as the address information. As a result of collation with the area-designating information 4b, "California" matches to the area-designating information belonging to an area No. 3. The area No. 3 can be designated as the targeted search area.

At Step 6, it is determined whether the certain search area designated as the candidate of the targeted search area is the same as the given search area of the current targeted search area. When the certain search area is determined to be different from the given search area, the processing proceeds to Step 7. Here, the targeted search area is switched from the given search area into the certain search area. Otherwise, when the certain search area is determined to be the same as the given search area, the processing proceeds to Step 9 without switching the targeted search area.

At Step 8, an effect that the targeted search area is switched is notified to the user through the display unit 5 and the speaker 6. Since the targeted search area should be basically designated by the user, switching the targeted search area is notified to the user for being confirmed by the user. Here, the new targeted search area is preferably notified for the user to recognize the switched targeted search area.

At Step 9 entered from Steps 7 and 8, the certain search area is currently designated as the targeted search area. Any one of the individual items, e.g., a facility name, an address, a phone number, registered in the selected address-book information item 4a is thereby collated with the search information 1a belonging to the certain search area for designating a search information item 4a. From the coordinates data of latitude and longitude of the designated search information item 1a, an on-map position is computed and the computed on-map position and the surrounding map are displayed on the display unit 5.

Thereafter, as terminating of the search function is commanded or the displayed on-map position is designated as a destination position, the processing at Step 10 is started.

At Step 10, it is determined whether switching the targeted search area is executed at Step 7. When the switching is determined to be executed, the targeted search area is switched back from the current targeted search area (certain search area) into the previous targeted search area (given search area) at Step 11. The user is apt to designate a search area that is frequently used as a targeted search area. After the above search processing using the certain search area as the targeted search area, the targeted search area is automatically switched back into the given search area. This enhances user's convenience.

As explained above, according to the car navigation device 100, area-designating information 4b for designating a targeted search area is stored with being related to each of areas Nos. 1, 2, 3, etc. When address information matches to a certain area-designating information item 4b, a targeted search area is assigned to a certain search area that includes the certain area-designating information item 4b. Accordingly, based on the area-designating information 4b and the address-book information 4a, the targeted search area can be automatically switched into the certain search area that includes an on-map position to be retrieved. This reduces bothersome procedure of a user in a map search.

(Modification)

In the above embodiment, registered individual items of the address-book information 4a are inputted by a user. However, the address-book information 4a can beforehand include, as registered individual items, names, addresses, or the like of tourist facilities, administrative facilities, or the like.

In the above embodiment, a single address-book information item 4a is selected from the address-book information 4a as a search item and the selected item is used for designating a targeted search area and then retrieving a corresponding on-map position. However, even when a user inputs as a search item a facility name, a phone number, or the like, the inputted search item can be also used for designating a targeted search area and then retrieving a corresponding on-map position. Here, there are two possibilities. For instance, the above inputted search item is at first collated with registered individual items within the address-book information 4a. When a certain registered individual item that matches to the inputted search item is present, the certain registered individual item is used for designating a corresponding search area. The corresponding search area is then automatically designated as a targeted search area.

Furthermore, for instance, in a case where the inputted search item includes address information, the inputted search item is directly used for designating a corresponding search area. Here, the address information means information including any kind of information that can locate a position, a location, an area, or the like. In detail, when "Bank of California" is inputted as the search item, "California" of an area name portion is extracted from the inputted search item. The extracted "California" can be determined whether it matches to any one of the area-designating information 4b.

Furthermore, in the above embodiment, the area-designating information 4b includes words indicating areas included in a corresponding search area. However, information other than the words indicating areas can be included in the area-designating information 4b. For instance, long distance numbers of phone numbers can be also included. Here, an inputted long distance number can be collated with registered individual items within the address-book information 4a for designating a corresponding search area. Namely, the long distance number can be also included in the address information.

It will be obvious to those skilled in the art that various changes may be made in the above-described embodiments of the present invention. However, the scope of the present invention should be determined by the following claims.

What is claimed is:

1. A map search system, comprising:
    a map data storing unit for storing a plurality of stored information items, each of the plurality of stored information items being assigned to one of a plurality of possible search areas;
    an area-designating information storage unit for storing a plurality of area-designating information items, each of the plurality of stored area-designating information items identifying one of the plurality of search areas;
    a designating unit for designating a first search area as a target search area for retrieval, the first search area being chosen from the plurality of possible search areas;
    a retrieving unit configured to search the target search area and retrieve one of the plurality of stored information items assigned to the target search area;
    an input unit for receiving an input item, the input item including a search area-designating information item; and
    a switching determination unit for determining whether the search area-designating item identifies the target search area;
    a search-area switching unit for switching the target search area from the first search area to a second search area associated with, the search area-designating information item, when the switching determination unit determines that the search area-designating item does not identify the target search area, the second search area being chosen from the plurality of possible search areas.

2. The map search system of claim 1,
    wherein the plurality of stored area-designating items include information items that indicate areas, each of which is capable of designating one of the plurality of possible search areas.

3. The map search system of claim 1, further comprising:
    an address-book storing unit for storing at least names that relate to positions and are associated with the plurality of stored area-designating items,
    wherein the search-area switching unit switches the target search area from the first search area into the second search area based on the search area-designating item associated with one of the names that is inputted.

4. The map search system of claim 1, further comprising:
    a communicating unit for communicating with a portable storage medium that includes an address-book storing unit for storing at least names that relate to positions and are associated with the plurality of stored area-designating items,
    wherein the search-area switching unit switches the target search area from the first search area to the second search area based on the search area-designating item associated with one of the names that is inputted.

5. The map search system of claim 1,
    wherein the search-area switching unit includes a notifying unit for notifying that the target search area is switched from the first search area to the second search area when the given search area-designating item is designated by an input item.

6. The map search system of claim 1,
    wherein the search-area switching unit switches back the target search area from the second search area to the first search area after a given period of time.

7. The map search system of claim 1,
    wherein the map search system is adapted to a car navigation device.

8. A search area designating method used in a map search system that stores (i) a plurality of information items, each of the plurality of information items being assigned to one of a plurality of search areas, and (ii) a plurality of stored search area-designating items, each of the plurality of stored search area-designating items identifying one of the plurality of search areas, the search area designating method comprising:
    designating a first search area selected from the plurality of search areas as a target search area for retrieval;
    receiving an input item, the input item including a received search area-designating information item;
    determining whether the received search area-designating information item identifies the first search area;
    switching the target search area from the first search area to a second search area when the received search area-designating information item is determined to not identify the first search area, the second search area being associated with the received search area-designating information item, the second search area being selected from the plurality of search areas; and
    searching the target search area to retrieve one of the plurality of information items.

* * * * *